Figures 1, 2:
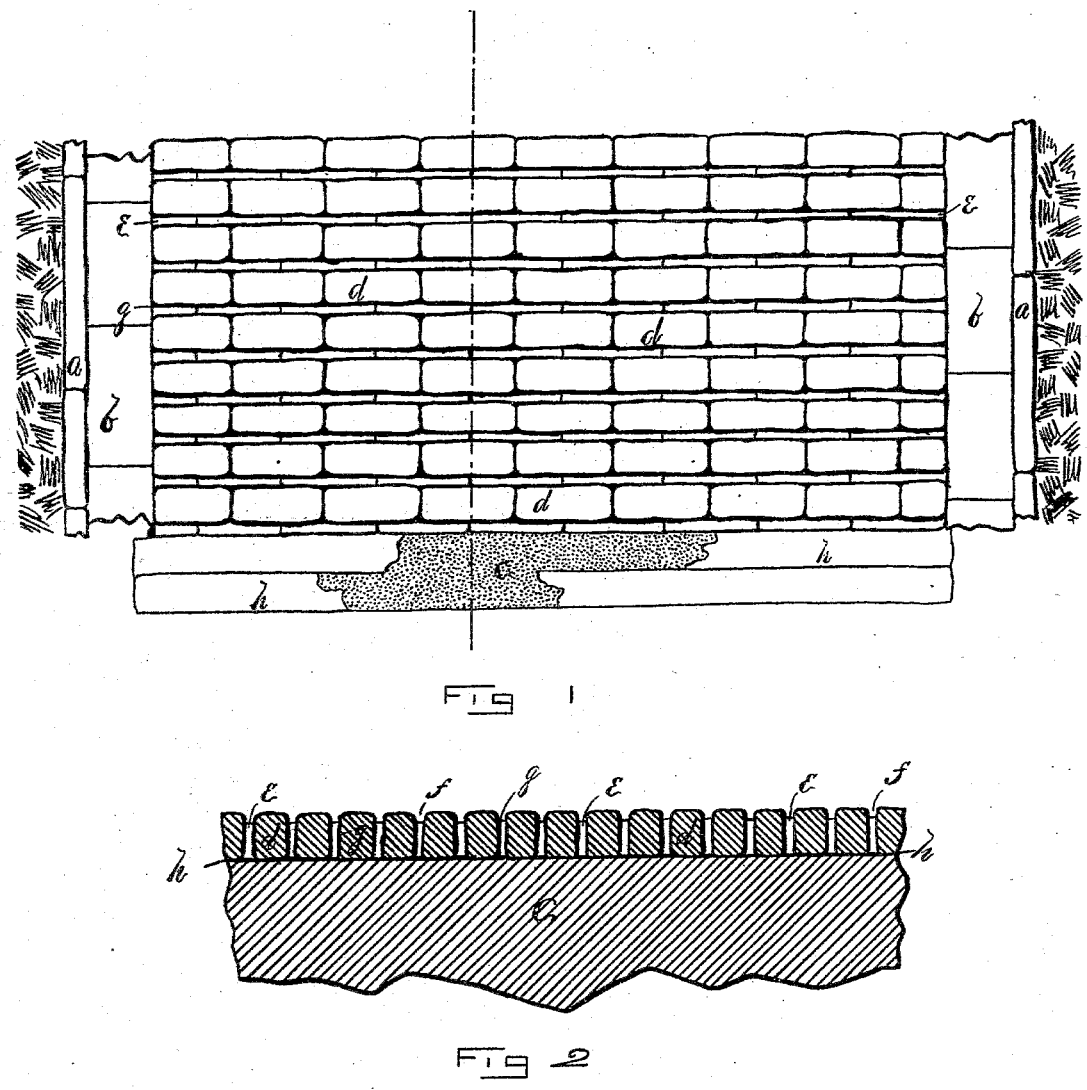

(No Model.)

F. W. BARTLETT.
PAVEMENT.

No. 288,970. Patented Nov. 27, 1883.

Witnesses:
Otto Hoddick
J. H. Marling

Inventor:
Frederick W. Bartlett
By W T Miller
Atty

UNITED STATES PATENT OFFICE.

FREDERICK W. BARTLETT, OF BUFFALO, NEW YORK.

PAVEMENT.

SPECIFICATION forming part of Letters Patent No. 288,970, dated November 27, 1883.

Application filed February 26, 1883. (No model.)

*To all whom it may concern:*

Be it known that I, FREDERICK W. BARTLETT, a citizen of the United States, residing at Buffalo, in the county of Erie and State of New York, have invented certain new and useful Improvements in Pavements; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to pavements of stone; and it consists, substantially, of paving-blocks of uniform size laid in regular courses, and having thin strips of stone, which do not reach to the wearing-surface proper of the pavement, laid between the larger paving-blocks, forming, with a suitable cement or other equivalent adhering material, the attaching medium of the larger blocks, whereby such blocks are securely and compactly held together, forming an extremely solid and durable pavement.

My invention further consists in heating the blocks and strips, or the strips alone, before placing them in position, by means of which the cement can be applied in a more thorough manner.

My invention further consists, in connection with the above-described pavement, of a thin layer of any suitable retaining material, which is to be laid upon the bed of the pavement before the paving-blocks are placed in position, its only object being to retain the cement between the blocks until it has become thoroughly set, thereby avoiding undue waste of the cement. This retaining material is not intended to form a permanent part of the pavement, but only to act as a check in preventing the bed of the pavement (which is always of a more or less porous nature) from absorbing, and thereby wasting, a considerable portion of the cement, the subsequent disintegration of this temporary retaining material not being intended to affect the integrity of the pavement in the slightest particular.

In the drawings, Figure 1 is a plan view of a portion of my improved pavement, and Fig. 2 is a longitudinal section taken in the line $x$ $x$ of Fig. 1.

Referring to the drawings, $a$ represents the curb, $b$ the gutter-stones, and $c$ the bed of the pavement, all of usual construction.

$d$ represents the larger paving-blocks, which form the wearing-surface, and which are cut of substantially uniform size.

$e$ represents the strips, which, as shown in the drawings, are quite thin. These strips $e$ may be quickly and cheaply made from stone of a laminiferous nature, such as argillaceous sandstone or slate. When in position, they do not reach quite to the surface of the larger blocks $d$, and are laid between the larger blocks, thereby forming the series of transverse depressions $f$ in the surface of the pavement. The blocks $d$ and strips $e$ are then firmly united at their contacting surfaces by any suitable cement, $g$, the depressions $f$ being preferably left comparatively free from the cement, so as to afford a reliable foothold for horses. In applying the cement between the stones composing the pavement I find that it is advantageous to heat the stones, or preferably the stone strips alone, previous to placing them in position, in order that the cement, asphalt, or other adhesive medium will not become set too suddenly and fail to incorporate itself thoroughly in all the interstices between the stones. For instance, if the adhering medium sets before reaching the bottom of a crevice, it effectually prevents the complete filling of such crevice, and its work is thereby imperfectly done; but by thoroughly heating the thin stone strips which are placed between the paving-blocks I find that the work is done in a complete and effective manner.

$h$ represents layers of suitable material—such as very thin wood or thick, stout paper; or in some instances thin slate could be employed—which are laid over the bed of the pavement, and upon which the paving-blocks $d$ and $e$ are placed. When the cement is applied between the blocks, this temporary material will retain the plastic cement until it has solidly filled the crevices and become thoroughly set, thereby preventing a considerable quantity of it from being absorbed by the porous bed, and consequently lost. This is an extremely desirable feature, especially where an expensive cement is employed. As the retaining-layers h are not intended as a permanent part of the structure, they can be made of very inexpensive material, it being only necessary that they should remain intact very little longer than the time sufficient to thoroughly set the cement, and their subsequent disintegration will be a matter of indifference after the pavement is once laid.

I am aware that thin strips of wood have been laid between paving-blocks of stone without the employment of cement, the object of such construction being to allow the wooden strips to swell from exposure to moisture, and thereby tighten the paving-blocks, and I do not therefore desire to claim such construction; but What I do claim is—

1. A pavement consisting of paving-blocks of substantially uniform size, laid in regular courses, and having thin strips of stone, which do not reach to the wearing-surface proper of the pavement, laid between the paving-blocks, the whole united by a suitable cement, substantially as shown and described.

2. A pavement consisting of the blocks d and the stone strips e, laid between the blocks d, the whole being firmly united by cement or other suitable adhering material, substantially as shown and described.

3. In a stone pavement, the temporary retaining material h, composed of paper or other equivalent material, laid upon the bed of the pavement and under the paving-blocks, to retain the cement in position between the stones or blocks until it becomes set, substantially as shown and described.

4. A pavement consisting of the blocks d, the stone strips e, laid between the blocks d, the temporary retaining material h, and the cement or other suitable adhering material, all arranged and combined substantially as shown and described.

5. The method of laying stone pavement, which consists, substantially, in heating the stones before placing them in position, and then applying the cement or other adhering material between the heated stones, substantially as and for the purpose stated.

In testimony whereof I have signed my name to this specification in the presence of two subscribing witnesses.

FREDERICK W. BARTLETT.

Witnesses:
W. T. MILLER,
OTTO HODDICK.